United States Patent
Savolainen

(10) Patent No.: US 6,438,377 B1
(45) Date of Patent: Aug. 20, 2002

(54) HANDOVER IN A MOBILE COMMUNICATION SYSTEM

(75) Inventor: Jari Savolainen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/125,693

(22) PCT Filed: Feb. 21, 1997

(86) PCT No.: PCT/FI97/00118
§ 371 (c)(1),
(2), (4) Date: Aug. 24, 1998

(87) PCT Pub. No.: WO97/31487
PCT Pub. Date: Aug. 28, 1997

(30) Foreign Application Priority Data

Feb. 23, 1996 (FI) .................................................. 960857

(51) Int. Cl.[7] .............................................. H04Q 7/20
(52) U.S. Cl. ...................... 455/439; 455/525; 370/332
(58) Field of Search ................................. 455/436, 437, 455/438, 439, 442, 517, 524, 525; 370/331, 332

(56) References Cited

U.S. PATENT DOCUMENTS 5,203,010 A * 4/1993 Felix et al. ................. 455/438
5,276,906 A * 1/1994 Felix ........................... 455/438
5,303,289 A * 4/1994 Quinn ......................... 455/438
5,396,541 A * 3/1995 Farwell et al. .............. 455/438
5,432,843 A * 7/1995 Bonta .......................... 455/438
6,157,833 A * 12/2000 Lawson-Jenkins et al. . 455/436

FOREIGN PATENT DOCUMENTS

| EP | 526 436 | 2/1993 |
| EP | 625863 | 11/1994 |
| GB | 2 268 858 | 1/1994 |
| WO | WO 92/09177 | 5/1992 |

* cited by examiner

Primary Examiner—Vivian Chin
Assistant Examiner—James Moore
(74) Attorney, Agent, or Firm—Pillsbury Winthrop LLP

(57) ABSTRACT

The invention relates to a handover method in a mobile communication system where the serving base station measures the level and/or quality of the uplink signal of a mobile station. The base station controller commands neighboring base stations to measure the level and/or quality of the uplink signal of the mobile station, when the serving base station has measured an uplink signal level and/or quality level lower than a predetermined triggering value. The base station controller performs a handover to the neighboring base station that has measured the most suitable uplink signal level and/or quality, when the serving base station has measured an uplink signal level and/or quality below a predetermined threshold value for handover.

20 Claims, 3 Drawing Sheets

HANDOVER IN A MOBILE COMMUNICATION SYSTEM

This application is the national phase of international application PCT/FI97/00118 filed Feb. 21, 1997 which designated the U.S.

FIELD OF THE INVENTION

The invention relates to a handover method comprising the steps of measuring the level and/or quality of an uplink signal of a mobile station at a serving base station. The invention further relates to a mobile communication system in which a serving base station measures the level and/or quality of an uplink signal of a mobile station.

BACKGROUND OF THE INVENTION

It is characteristic of cellular mobile communication systems that mobile stations may roam freely and switch from one cell to another within the area of a mobile communication system. If the mobile station MS has no call in progress, the cell crossover involves only registration with a new cell. If the mobile station MS has a call in progress during the cell crossover, the call must also be switched from one base station to another in such a way that the call is disturbed as little as possible. The latter procedure is called a handover. Handover may also take place within a cell from one traffic channel to another. To allow the mobile communication system to detect the need for handover and select a suitable target cell for handover, it is necessary to carry out various measurements of the quality of the radio connection and measurements of the field strengths of neighbouring cells. Handover from a serving cell to a neighbouring cell may take place, for example, when the measurement results of the mobile station/base station indicate a low signal level and/or quality for the currently serving cell, and a higher signal level can be achieved in a neighbouring cell. To ensure stability in a mobile communication network, the measurement results and parameters used in handover are averaged over a pre-set period of time. The averaging process makes handover less sensitive to measurement results distorted by instantaneous interference or fading.

FIG. 1 of the appended drawings shows a simplified block diagram of the pan-European GSM mobile communication system. A mobile station MS is connected over a radio path to a base transceiver station BTS, in the case of FIG. 1 to BTS3. A base station system BSS consists of base stations BTS controlled by a base station controller BSC. Each base station BTS comprises one or more transceiver units. A plurality of base station controllers BSC usually operate under the control of a mobile services switching center MSC. An MSC communicates with other MSCs and a public switched telephone network. The subscriber registers of the GSM system include at least a home location register HLR and a visitor location register VLR (not shown in FIG. 1). The subscriber data of a mobile subscriber are stored permanently in the HLR of the system and temporarily in the VLR in the area of which the MS is located at a given moment.

In order to enable a handover decision, a mobile station MS continuously measures downlink signals from the base stations BTS adjacent to the serving base station. In the GSM mobile communication network, for example, an MS may simultaneously measure the signal level and/or quality of both the serving base station and up to 32 other base stations. The serving base station informs the mobile station of the neighbouring base stations it should measure. The measurement results of each base station are identified on the basis of a base station identity code BSIC.

The MS sends the measurement results regularly in a report message through the serving base station BTS to the base station controller BSC. The report message contains the measurement results of the serving base station and up to six best neighbouring base stations. The base station controller BSC makes the handover decisions. However, if the target cell is controlled by another BSC, the handover is performed under the control of the MSC. Handover decisions may also be made in a centralized manner in the MSC. If necessary, the BSC sends a handover command to the MS through the serving BTS. According to the GSM recommendations, the rate at which measurement results are reported is at least once a second. In most applications, the MS reports the measurement results at intervals of 480 ms.

WO 92/09177 discloses a handover method for elongated cells located crosswise. According to this method, a radio telephone is handed over to a cell in the radio telephone's direction of travel. The strength of signals from the surrounding cells is measured over a period of 30 to 60 seconds for a handover decision. The two strongest cells are determined on the basis of the measurement results, and the identities of these cells are stored in the radio telephone's memory. If the cell that had the highest signal strength according to the measurements still has the highest or second highest signal strength after thirty seconds, a handover will be performed to this cell. Otherwise the currently serving cell is selected to continue the communication, and the measurement of signal strengths of the adjacent cells is also continued. The method is based on the idea that a cell along the direction of travel remains strong over the interval of time between measurements, whereas the signal strength of a cell that is perpendicular to the radio telephone's direction of travel is high only for a short time. Since the method requires that a measurement is carried out for a certain period of time, it is not applicable to a fast handover, when the signal strength suddenly drops in the serving cell.

WO 95/35006 discloses a handover method based on the use of chained cells. In the mobile communication system disclosed, cells are arranged as chains of two or more cells, which allows a fast handover to a chained cell when the signal level suddenly drops in the serving cell, for instance when a high-speed mobile station suddenly moves behind an obstacle formed by the terrain or behind a building. The base station of the serving cell measures the uplink signal level of the mobile station. If the uplink signal suddenly drops below a predetermined threshold level, a fast handover is performed to one of the chained cells assigned to the serving cell. To ensure a sufficiently fast handover, the handover decision is made on the basis of instantaneous strength of the uplink signal. A mobile station constantly measures the downlink signal level of the neighbouring cells of the serving cell. If the serving cell has a plurality of chained cells, the handover is performed to the chained cell which, according to a few of the latest measurements, has the highest field strength. The problem is how to select the correct chained cell in an environment with several obstacles. Since the measurement results of the mobile station are averaged and there is a delay in the reporting, the measurement results are not up to date. The best chained cell selected on the basis of the latest measurements may remain behind another obstacle, in which case the signal level offered by it is no longer sufficient for maintaining a call.

BRIEF DESCRIPTION OF THE INVENTION

The object of the present invention is to provide a controlled and reliable handover even in difficult environments with several obstacles.

This new type of handover is achieved with a method of the invention, which is characterized by measuring the level and/or quality of the uplink signal of the mobile station at neighbouring base stations, when the level and/or quality of the uplink signal has dropped below a predetermined triggering value at the serving base station, and performing handover to the neighbouring base station that has measured the most suitable uplink signal level and/or quality, when the uplink signal level and/or quality has dropped below a predetermined threshold value for handover at the serving base station.

The invention also relates to a mobile communication system of the type described in the introductory portion. The mobile communication system of the invention is characterized in that a base station controller is arranged to command neighbouring base stations to measure the level and/or quality of the uplink signal of the mobile station, when the serving base station has measured an uplink signal level and/or quality lower than a predetermined triggering value, and perform a handover to the neighbouring base station that has measured the most suitable uplink signal level and/or quality, when the serving base station has measured an uplink signal level and/or quality lower than a predetermined threshold value for handover.

The invention is based on the idea of measuring the level and/or quality of the uplink signal from a mobile station on a real time basis at the neighbouring cells in order to determine the best target cell for the handover.

In the mobile communication system of the invention, the uplink signal level and/or quality from the mobile station is measured at the neighbouring base stations before a handover, and the most suitable target cell is determined for the handover on the basis of these measurement results. Handover is anticipated when the level and/or quality of the uplink signal received at the serving base station drops close to the value used as the handover criterion.

One of the advantages of the fast handover method of the invention is that the best target cell for handover can be determined rapidly even in very difficult environments.

A further advantage of the handover of the invention is that it allows a call to be maintained more reliably by means of a handover to the best neighbouring cell, while the number of handovers is minimized.

BRIEF DESCRIPTION OF THE DRAWINGS

In the following, the invention will be described in greater detail with reference to the accompanying drawings, in which.

DETAILED DESCRIPTION OF THE INVENTION

Figure 1:
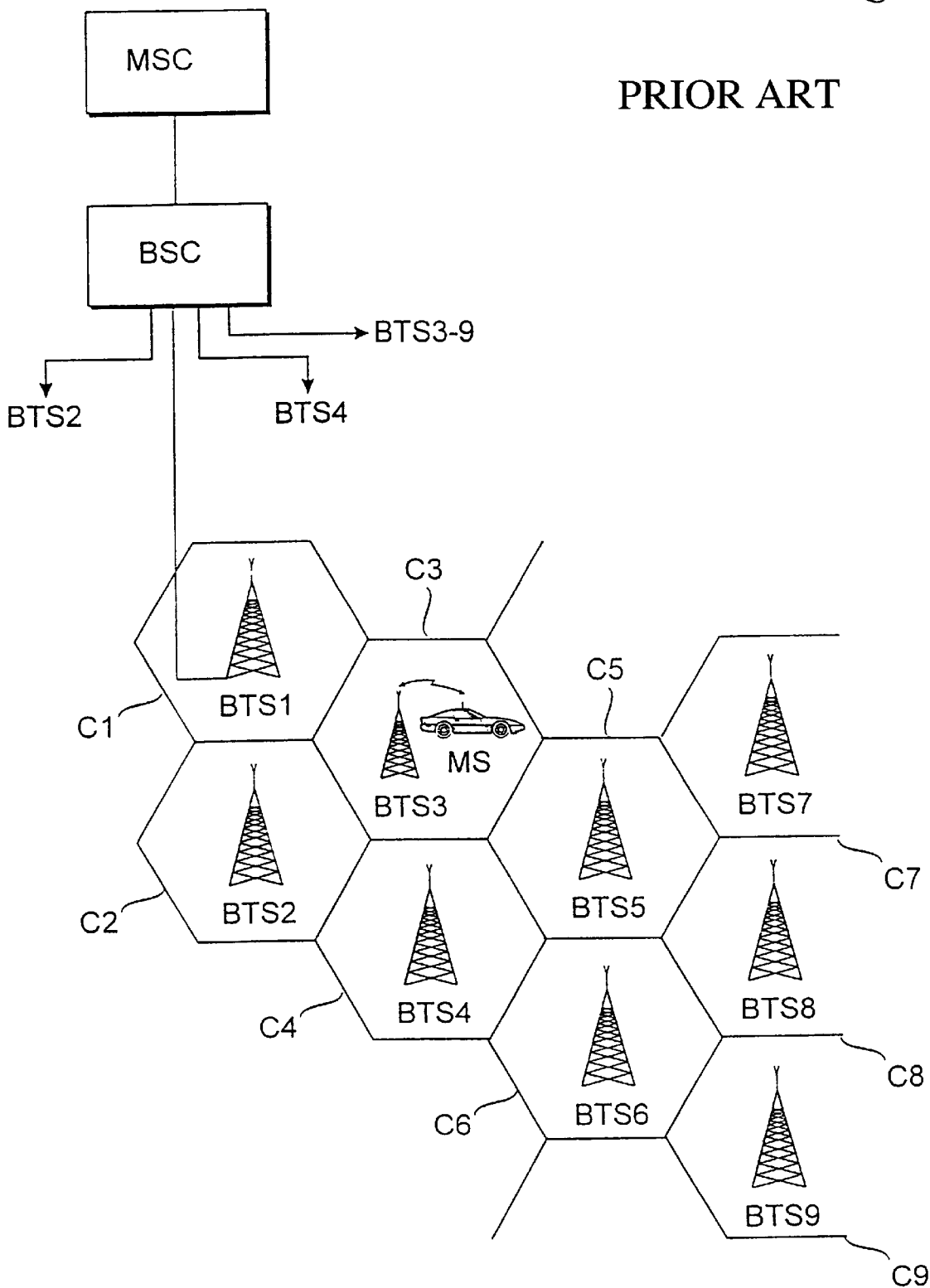
FIG. 1 is a simplified block diagram of a mobile communication system.
Figure 2:
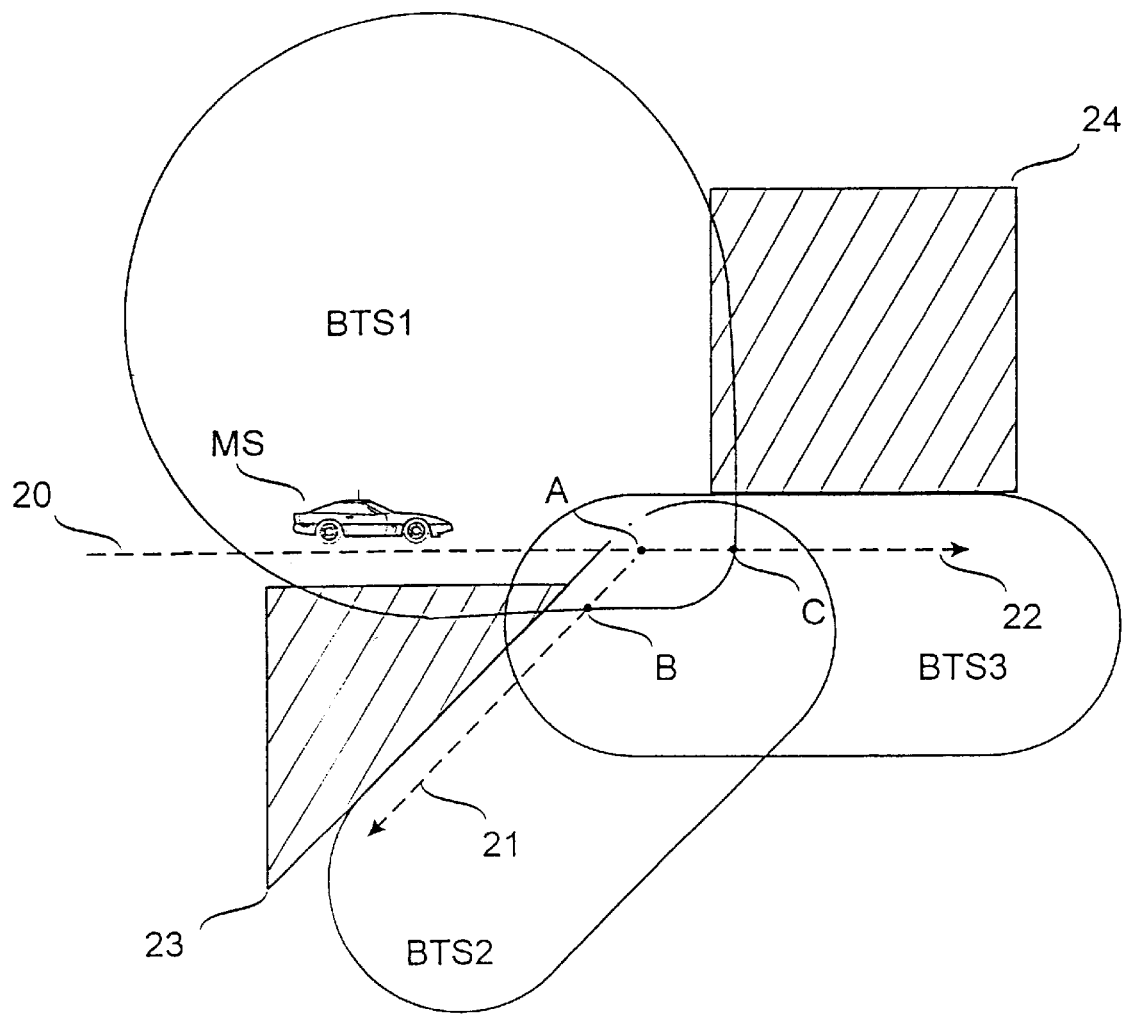
FIG. 2 illustrates a handover in an environment with several obstacles.

The present invention can be applied in any cellular mobile communication system. In the following, the invention will be described in greater detail with reference, by way of example, to the pan-European digital mobile communication system GSM. FIG. 2 illustrates the above-described structure of a GSM network in a simplified manner. For a more accurate description of the GSM system, reference is made to the GSM recommendations and "The GSM System for Mobile Communications" by M. Mouly and M -B. Pautet, Palaiseau, France, 1992, ISBN: 2-9507190-0-7.

FIG. 2 shows an example of handover when two obstacles 23, 24 obstruct (shadow) the radio propagation of base station signals. A mobile station MS is assumed to travel along route 20 in the cell of base station BTS1. At point A the MS receives signals of substantially the same level from base stations BTS2 and BTS3. According to the prior art method of chained cells, the target cell for handover is selected when the mobile station has moved to point B or C on the basis of the measurement made at point A. Depending on the travelling route 21 or 22 chosen by the MS, only one of the neighbouring base stations BTS2, BTS3 is an optimal target cell.

According to the method of the present invention, the uplink signal of the MS measured by the serving base station BTS1 at point A is lower than a predetermined triggering value L, which is preferably slightly higher than a threshold value HO_L starting a handover. The base station controller BSC commands the neighbouring base stations BTS2 and BTS3 to start measurements of the uplink signal of the MS, preferably through an extra receiver, e.g. a diversity receiver. When the MS travels further along route 21, it moves behind an obstacle 23 at point B, whereby the uplink signal at the serving base station BTS1 drops below the predetermined threshold value HO_L, which is preferably equal to the threshold value which starts a normal handover. The BSC compares the latest uplink measurement results of both BTS2 and BTS3, and on the basis of these determines the best target cell for handover. The best target cell is preferably the base station that has last measured the highest uplink signal level from the MS, i.e. BTS2 in FIG. 2. The BSC instructs the MS by a handover command to switch to BTS2. The handover command is preferably sent to the MS through the base station BTS2 of the target cell so that the weakened signal level of BTS1 will not prevent a successful handover. When the BTS2 sends a handover command by an extra transceiver unit, for example, at the transmission frequency and in the transmission time slot of BTS1, BTS1 is "silent", i.e. its transmission is interrupted. This "interleaving" of the transmission of BTS1 and BTS2 is controlled by the BSC. After a successful handover, the BSC instructs BTS2 and BTS3 to release their extra transceiver units from measuring the uplink signal of the MS. The call of the MS is continued through the normal transceiver unit of BTS2.

Correspondingly, when the MS travels further along route 22, a handover is started at point C to the best neighbouring base station, which in this case is BTS3. The best target cell is determined on the basis of the uplink signal measurements started by BTS2 and BTS3 at point A. A handover command through BTS3 commands the MS to switch to the traffic channel of BTS3.

According to another embodiment of the invention, the serving base station BTS1 and the neighbouring base stations BTS2, BTS3 can measure the quality of the uplink signal of the MS, instead of or in addition to the level of the uplink signal. In this case the decision on starting measurements at the neighbouring base stations and the selection of the target cell are based on the quality of the uplink signal, such as the bit error ratio BER, or the combined effect of the level and quality of the uplink signal.

The criteria for decisions concerning starting of measurements and handover are not, however, limited to the examples described above. It is also possible to use any other criteria suitable for handover.

Figure 3:
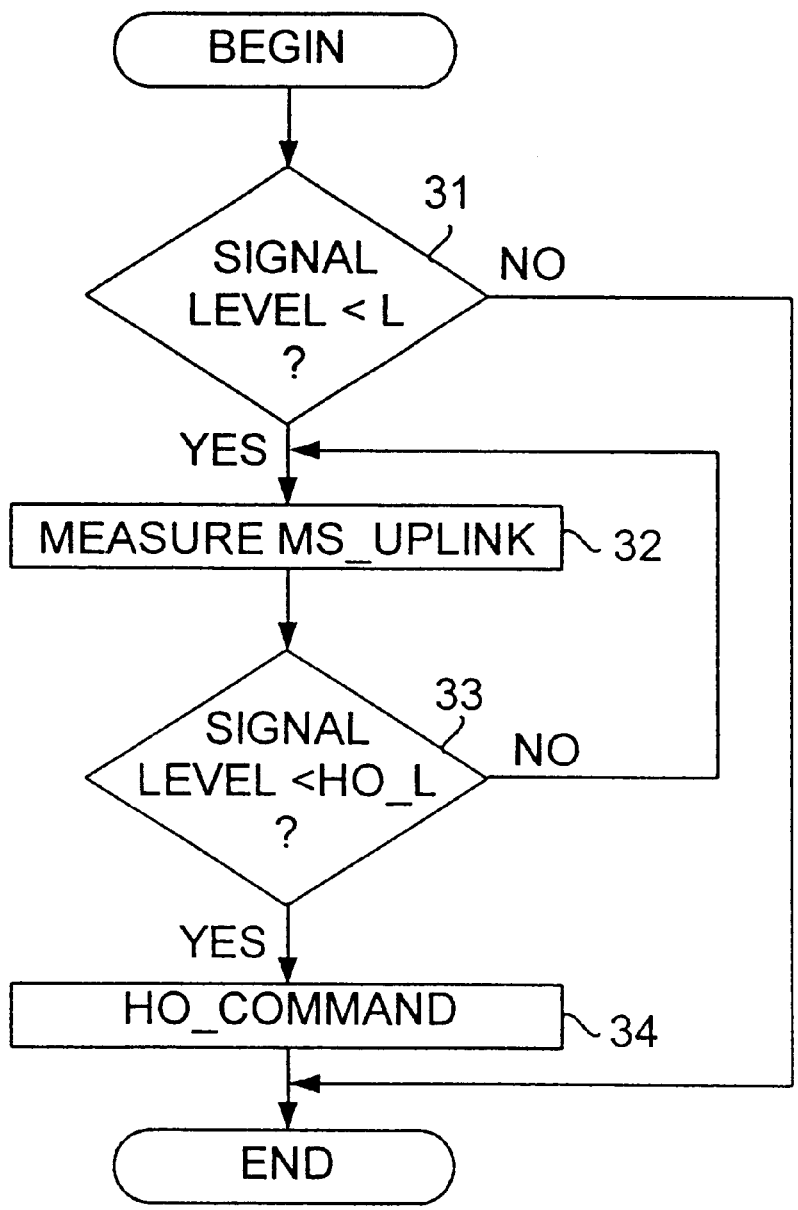
FIG. 3 is a flow chart of a preferred embodiment of the method of the invention.

FIG. 3 is a flow chart of the preferred embodiment of the method of the invention. The functionality illustrated is provided, for example, in the base station controller BSC. The serving base station, BTS1 in FIG. 2, constantly measures the level of the uplink signal from the MS, and forwards the measurement results to the BSC. In the method of the invention, the measurement results may be used before averaging to allow the system to react rapidly to a sudden drop in the signal level. These single measurement results are compared with a predetermined triggering value L (step 31 in FIG. 3). If the level of the uplink signal of the MS is lower than the triggering value L at the serving BTS1, the BSC commands the neighbouring base stations, e.g. BTS2 and BTS3, to start measuring the uplink signal level of the MS by their extra receivers (step 32). The extra receivers are tuned for the measurement to the transmission frequency of the MS, i.e. to the receiving frequency of the serving base station BTS1, to receive the uplink signal in the correct time slot. The extra receivers measure the uplink signal on a real time basis without averaging, but it is also possible to average the measurement results appropriately, if necessary. The measurement results are forwarded to the BSC. The serving base station BTS1 continues to measure the uplink signal of the MS as normal. The instantaneous uplink signal levels measured by BTS1 are compared with a handover threshold value HO_L, which is preferably the threshold value for normal handover (step 33). The neighbouring base stations continue to measure the uplink signal of the MS until it is lower than the handover threshold value HO_L at the serving base station BTS1. The BSC selects the highest signal level from the uplink measurement results last measured by the neighbouring base stations—BTS2 and BTS3 in FIG. 2—and commands the neighbouring base station that reported this measurement result, e.g. BTS2, to give a handover command by an extra transmitter to the MS (step 34). By the handover command transmitted at the transmission frequency and in the transmission time slot of BTS1, the MS is commanded to switch to an allocated traffic channel of BTS2. BTS1 remains "silent" during the handover command given by BTS2. The MS performs a handover to BTS2, whereafter the extra transceiver units of BTS2 and BTS3 can be released from monitoring the uplink signal.

If one of the neighbouring base stations is under the control of another BSC, it is the mobile services switching center MSC that controls the measurements of the neighbouring base stations and the decisions relating to handover.

The method of the invention can also be used for simultaneous measurement of the uplink signal of a plurality of mobile stations. In this case the base stations must be provided with a sufficient number of receiver units.

The handover method of the invention can also be used in mobile communication systems in which only some of the base stations are provided with a transceiver unit for carrying out the functionality of the invention. In this case, the selection of an optimal target cell for handover is limited to these base stations only. However, one of the potential embodiments of the invention is partial utilization of the method of the invention in extremely difficult environments.

In order for the synchronization of the mobile communication system to be maintained, the propagation delay of the MS transmission must not be too great at the reception of the neighbouring base stations. Therefore the use of the method is restricted in cellular networks where the cell size is large. The method is particularly suitable for use in cellular networks comprising microcells and picocells.

The drawings and the associated description are intended merely to illustrate the inventive concept. In its details, the fast handover of the invention may be modified within the scope of the appended claims. Although the invention has been described above mainly with reference to handover during a call, it can also be used for other types of handover in a mobile communication system.

What is claimed is:

1. A handover method comprising:

measuring at least one of a level and a quality of an uplink signal of a mobile station at a serving base station, comparing the at least one of the level and the quality of the uplink signal measured at the serving base station with a predetermined triggering value and a predetermined threshold value by a base station controller, said base station controller commanding predetermined neighboring base stations to measure the at least one of the level and the quality of the uplink signal of the mobile station at said neighboring base stations, when the at least one of the level and the quality of the uplink signal has dropped below said predetermined triggering value at said serving base station, the neighboring base stations being determined by the base station controller prior to the quality of the uplink signal dropping below the predetermined triggering value, and said base station controller commanding said mobile station to perform a handover to one of said predetermined neighboring base stations that has measured a most suitable of the at least one of the uplink signal level and the quality, when the at least one of the uplink signal level and the quality has dropped below said predetermined threshold value for handover at the serving base station.

2. A handover method according to claim 1, comprising performing the handover to the neighboring base station that has last measured a highest uplink signal level.

3. A handover method comprising:

measuring at least one of a level and a quality of an uplink signal of a mobile station at a serving base station, comparing the at least one of the level and the quality of the uplink signal measured at the serving base station with a predetermined triggering value and a predetermined threshold value by a base station controller, said base station controller commanding an extra transceiver unit at a predetermined neighboring base stations to carry out measuring of the at least one of the level and the quality of the uplink signal of said mobile station at a transmission frequency and in a transmission time slot of the mobile station, when the at least one of the level and the quality of the uplink signal has dropped below said predetermined triggering value at said serving base station, the neighboring base stations being determined by the base station controller prior to the quality of the uplink signal dropping below the predetermined triggering value, and said base station controller commanding said mobile station to perform a handover to one of said predetermined neighboring base stations that has measured a most suitable of the at least one of the uplink signal level and the quality, when the at least one of the uplink signal level and the quality has dropped below said predetermined threshold value for the handover at the serving base station.

4. A handover method according to claim 3, comprising performing the handover to the neighboring base station that has last measured a highest uplink signal level.

5. A handover method comprising:

measuring at least one of a level and a quality of an uplink signal of a mobile station at a serving base station, comparing the at least one of the level and the quality of the uplink signal measured at the serving base station with a predetermined triggering value and a predetermined threshold value by a base station controller, said base station controller commanding predetermined neighboring base stations to measure the at least one of the level and the quality of the uplink signal of the mobile station at said neighboring base stations, when the at least one of the level and the quality of the uplink signal has dropped below said predetermined triggering value at said serving base station, the neighboring base stations being determined by the base station controller prior to the quality of the uplink signal dropping below the predetermined triggering value, and said base station controller, responsive to the at least one of the uplink signal level and the quality having dropped below said predetermined threshold value for handover at the serving base station, commanding said mobile station to perform a handover to one of said predetermined neighboring base stations that has measured a most suitable of the at least one of the uplink signal level and the quality, by sending a handover command to the mobile station at a transmission frequency and in a transmission time slot of the serving base station from said one of said neighboring base station which is a target of the handover.

6. A handover method according to claim 5, further comprising interrupting a transmission of the serving base station for an amount of time it takes to transmit a handover command.

7. A handover method according to claim 6 wherein said step of commanding said mobile station to perform said handover comprises sending a handover command to the mobile station through an extra transceiver unit of the neighboring base station.

8. A handover method according to claim 5, wherein said step of commanding said mobile station to perform said handover comprises sending a handover command to the mobile station through an extra transceiver unit of the neighboring base station.

9. A mobile communication system, comprising
a mobile station,
a plurality of base stations, and
a base station controller, wherein:
a serving one of said base stations is arranged to measure at least one of a level and a quality of an uplink signal of said mobile station,
said base station controller is arranged to compare the at least one of the level and the quality of the uplink signal measured at the serving base station with a predetermined triggering value and a predetermined threshold value,
said base station controller is arranged to command predetermined neighboring base stations to measure the at least one of the level and the quality of the uplink signal of the mobile station, when the serving base station has measured the at least one of the uplink signal level and the quality lower than said predetermined triggering value, the neighboring base stations being determined by the base station controller prior to the quality of the uplink signal dropping below the predetermined triggering value, and
said base station controller is responsive to the at least one of the uplink signal level and the quality having dropped below said predetermined threshold value for handover at the serving base station, for sending a handover command to the mobile station at a transmission frequency and in a transmission time slot of the serving base station from one of said predetermined neighboring base stations that has measured a most suitable of the at least one of the uplink signal level and the quality, and for commanding the serving base station to interrupt its transmission for an amount of time it takes to transmit a handover command, said handover command commanding said mobile station to perform a handover to said one of said neighboring base stations.

10. A mobile communication system according to claim 9, wherein an extra transceiver unit of the one of said neighboring base stations is arranged to send the handover command to the mobile station.

11. A mobile communication system, comprising
a mobile station,
a plurality of base stations,
a base station controller,
means for performing a first handover process which is based on measuring downlink signals from neighboring base stations by the mobile station and reporting measurement results regularly to said base station controller for a handover decision by the base station controller,
means for performing a second handover process for difficult radio propagation environments with obstacles causing sudden drops in a signal strength from a serving base station, said second handover process comprising:
a) a serving one of said base stations measuring at least one of a level and a quality of an uplink signal of said mobile station,
b) said base station controller comparing the at least one of the level and the quality of the uplink signal measured the serving base station with a predetermined triggering value and a predetermined threshold value,
c) said base station controller commanding predetermined neighboring base stations to measure the at least one of the level and the quality of the uplink signal of the mobile station, when the serving base station has measured the at least one of the uplink signal level and the quality being lower than said predetermined threshold value for handover, the neighboring base stations being determined by the base station controller prior to the quality of the uplink signal dropping below the predetermined triggering value, and
d) said base station controller performing a handover to one of said predetermined neighboring base stations that has measured a most suitable of the at least one of the uplink signal level and the quality, when the serving base station has measured the one of the uplink signal level and the quality being lower than said predetermined threshold value for handover.

12. A mobile communication system, comprising
a mobile station,
a plurality of base stations, and
a base station controller, wherein:
a serving one of said base stations is arranged to measure at least one of a level and a quality of an uplink signal of said mobile station,
said base station controller is arranged to compare the at least one of the level and the quality of the uplink signal measured at the serving base station with a predetermined triggering value and a predetermined threshold value, said base station controller is arranged to command predetermined neighboring base stations to measure the at least one of the level and the quality of the uplink signal of the mobile station, when the serving base station has measured the at least one of the uplink signal level and the quality lower than said predetermined triggering value, the neighboring base stations being determined by the base station controller prior to the quality of the uplink signal dropping below the predetermined triggering value, and said base station controller is arranged to perform a handover to one of said predetermined neighboring base station that has measured a most suitable of the at least one of the uplink signal level and the quality, when the serving base station has measured the at least one of the uplink signal level and the quality lower than predetermined threshold value for a handover.

13. A mobile communication system according to claim 12, wherein at least some of the base stations comprise at least one extra transceiver unit each, and that the extra transceiver unit of the neighboring base stations is arranged to measure the at least one of the level and the quality of the uplink signal of the mobile station.

14. A mobile communication system according to claim 12, wherein said mobile communication system further comprises means for performing a further handover process which is based on measuring downlink signals from neighboring base stations by the mobile station and reporting measurement results regularly to the base station controller for a handover by one of the base station controller and a mobile services switching center.

15. A handover method comprising:

measuring at least one of a level and a quality of an uplink signal of a mobile station at a serving base station, comparing the at least one of the level and the quality of the uplink signal measured at the serving base station with a predetermined triggering value and a predetermined threshold value by a base station controller, said base station controller commanding predetermined neighboring base stations to measure the at least one of the level and the quality of the uplink signal of the mobile station at said neighboring base stations, when the at least one of the level and the quality of the uplink signal has dropped below said predetermined triggering value at said serving base station, the neighboring base stations comprising a fixed set of chained base stations assigned to said serving base station, and said base station controller commanding said mobile station to perform a handover to one of said predetermined neighboring base stations that has measured a most suitable of the at least one of the uplink signal level and the quality, when the at least one of the uplink signal level and the quality has dropped below said predetermined threshold value for handover at the serving base station.

16. A handover method comprising:

measuring at least one of a level and a quality of an uplink signal of a mobile station at a serving base station, comparing the at least one of the level and the quality of the uplink signal measured at the serving base station with a predetermined triggering value and a predetermined threshold value by a base station controller, said base station controller commanding an extra transceiver unit at a predetermined neighboring base stations to carry out measuring of the at least one of the level and the quality of the uplink signal of said mobile station at a transmission frequency and in a transmission time slot of the mobile station, when the at least one of the level and the quality of the uplink signal has dropped below said predetermined triggering value at said serving base station, the neighboring base stations comprising a fixed set of chained base stations assigned to said serving base station, and said base station controller commanding said mobile station to perform a handover to one of said predetermined neighboring base stations that has measured a most suitable of the at least one of the uplink signal level and the quality, when the at least one of the uplink signal level and the quality has dropped below said predetermined threshold value for the handover at the serving base station.

17. A handover method comprising:

measuring at least one of a level and a quality of an uplink signal of a mobile station at a serving base station, comparing the at least one of the level and the quality of the uplink signal measured at the serving base station with a predetermined triggering value and a predetermined threshold value by a base station controller, said base station controller commanding predetermined neighboring base stations to measure the at least one of the level and the quality of the uplink signal of the mobile station at said neighboring base stations, when the at least one of the level and the quality of the uplink signal has dropped below said predetermined triggering value at said serving base station, the neighboring base stations comprising a fixed set of chained base stations assigned to said serving base station, and said base station controller, responsive to the at least one of the uplink signal level and the quality having dropped below said predetermined threshold value for handover at the serving base station, commanding said mobile station to perform a handover to one of said predetermined neighboring base stations that has measured a most suitable of the at least one of the uplink signal level and the quality, by sending a handover command to the mobile station at a transmission frequency and in a transmission time slot of the serving base station from said one of said neighboring base station which is a target of the handover.

18. A mobile communication system, comprising a mobile station, a plurality of base stations, and a base station controller, wherein:

a serving one of said base stations is arranged to measure at least one of a level and a quality of an uplink signal of said mobile station, said base station controller is arranged to compare the at least one of the level and the quality of the uplink signal measured at the serving base station with a predetermined triggering value and a predetermined threshold value, said base station controller is arranged to command predetermined neighboring base stations to measure the at least one of the level and the quality of the uplink signal of the mobile station, when the serving base station has measured the at least one of the uplink signal level and the quality lower than said predetermined triggering value, the neighboring base stations comprising a fixed set of chained base stations assigned to said serving base station, and said base station controller is responsive to the at least one of the uplink signal level and the quality having dropped below said predetermined threshold value for handover at the serving base station, for sending a handover command to the mobile station at a transmission frequency and in a transmission time slot of the serving base station from one of said predetermined neighboring base stations that has measured a most suitable of the at least one of the uplink signal level and the quality, and for commanding the serving base station to interrupt its transmission for an amount of time it takes to transmit a handover command, said handover command commanding said mobile station to perform a handover to said one of said neighboring base stations.

19. A mobile communication system, comprising a mobile station, a plurality of base stations, a base station controller, means for performing a first handover process which is based on measuring downlink signals from neighboring base stations by the mobile station and reporting measurement results regularly to said base station controller for a handover decision by the base station controller, means for performing a second handover process for difficult radio propagation environments with obstacles causing sudden drops in a signal strength from a serving base station, said second handover process comprising:
  a) a serving one of said base stations measuring at least one of a level and a quality of an uplink signal of said mobile station,
  b) said base station controller comparing the at least one of the level and the quality of the uplink signal measured the serving base station with a predetermined triggering value and a predetermined threshold value,
  c) said base station controller commanding predetermined neighboring base stations to measure the at least one of the level and the quality of the uplink signal of the mobile station, when the serving base station has measured the at least one of the uplink signal level and the quality being lower than said predetermined threshold value for handover, the neighboring base stations comprising a fixed set of chained base stations assigned to said serving base station, and
  d) said base station controller performing a handover to one of said predetermined neighboring base stations that has measured a most suitable of the at least one of the uplink signal level and the quality, when the serving base station has measured the one of the uplink signal level and the quality being lower than said predetermined threshold value for handover.

20. A mobile communication system, comprising a mobile station, a plurality of base stations, and a base station controller, wherein:

a serving one of said base stations is arranged to measure at least one of a level and a quality of an uplink signal of said mobile station, said base station controller is arranged to compare the at least one of the level and the quality of the uplink signal measured at the serving base station with a predetermined triggering value and a predetermined threshold value, said base station controller is arranged to command predetermined neighboring base stations to measure the at least one of the level and the quality of the uplink signal of the mobile station, when the serving base station has measured the at least one of the uplink signal level and the quality lower than said predetermined triggering value, the neighboring base stations comprising a fixed set of chained base stations assigned to said serving base station, and said base station controller is arranged to perform a handover to one of said predetermined neighboring base station that has measured a most suitable of the at least one of the uplink signal level and the quality, when the serving base station has measured the at least one of the uplink signal level and the quality lower than predetermined threshold value for a handover.

\* \* \* \* \*